United States Patent [19]

Fremd

[11] Patent Number: 4,719,445
[45] Date of Patent: Jan. 12, 1988

[54] METHOD AND DEVICE FOR SIMULTANEOUSLY DETERMINING STEERING AND WHEEL SUSPENSION GEOMETRIES AND STATE OF BALANCE OF STEERING LINKAGE ROTATING PARTS

[75] Inventor: Rainer Fremd, Stuttgart, Fed. Rep. of Germany

[73] Assignee: Daimler-Benz Aktiengesellschaft, Stuttgart, Fed. Rep. of Germany

[21] Appl. No.: 933,395

[22] Filed: Nov. 21, 1986

[30] Foreign Application Priority Data

Nov. 27, 1985 [DE] Fed. Rep. of Germany ....... 3541901

[51] Int. Cl.[4] ............................................... B60Q 9/00
[52] U.S. Cl. .................................... 340/52 R; 340/686
[58] Field of Search ............... 340/52 R, 686; 180/78, 180/79; 33/203; 307/10 R

[56] References Cited

U.S. PATENT DOCUMENTS

| | | | |
|---|---|---|---|
| 3,438,646 | 4/1969 | Hannapel | 340/52 R X |
| 3,744,321 | 7/1973 | Hauge | 340/52 R X |
| 3,936,071 | 2/1976 | Ricketts, Jr. et al. | 340/52 R X |
| 3,980,999 | 9/1976 | Nishioka et al. | 340/52 R X |

FOREIGN PATENT DOCUMENTS 2819687 11/1979 Fed. Rep. of Germany.

OTHER PUBLICATIONS

"Frequency Investigations of the Steering Deflections Occurring as a Function of the Operating Conditions", H. Heider, *Vehicle Steering*, VEB Verlag Technik, Berlin, 1970, pp. 269-281.

Primary Examiner—James L. Rowland
Assistant Examiner—Brian R. Tumm
Attorney, Agent, or Firm—Barnes & Thornburg

[57] ABSTRACT

A method and device for automatically monitoring the state of steering and wheel suspension geometry and the state of balance of rotating parts connected to the steering linkage of a motor vehicle and for warning the vehicle driver when the state of the monitored parts is incorrect. Statistical methods are employed for analyzing the signals corresponding to the positions and motions of the steering linkage and generated by a single sensor on the steering linkage.

16 Claims, 1 Drawing Figure

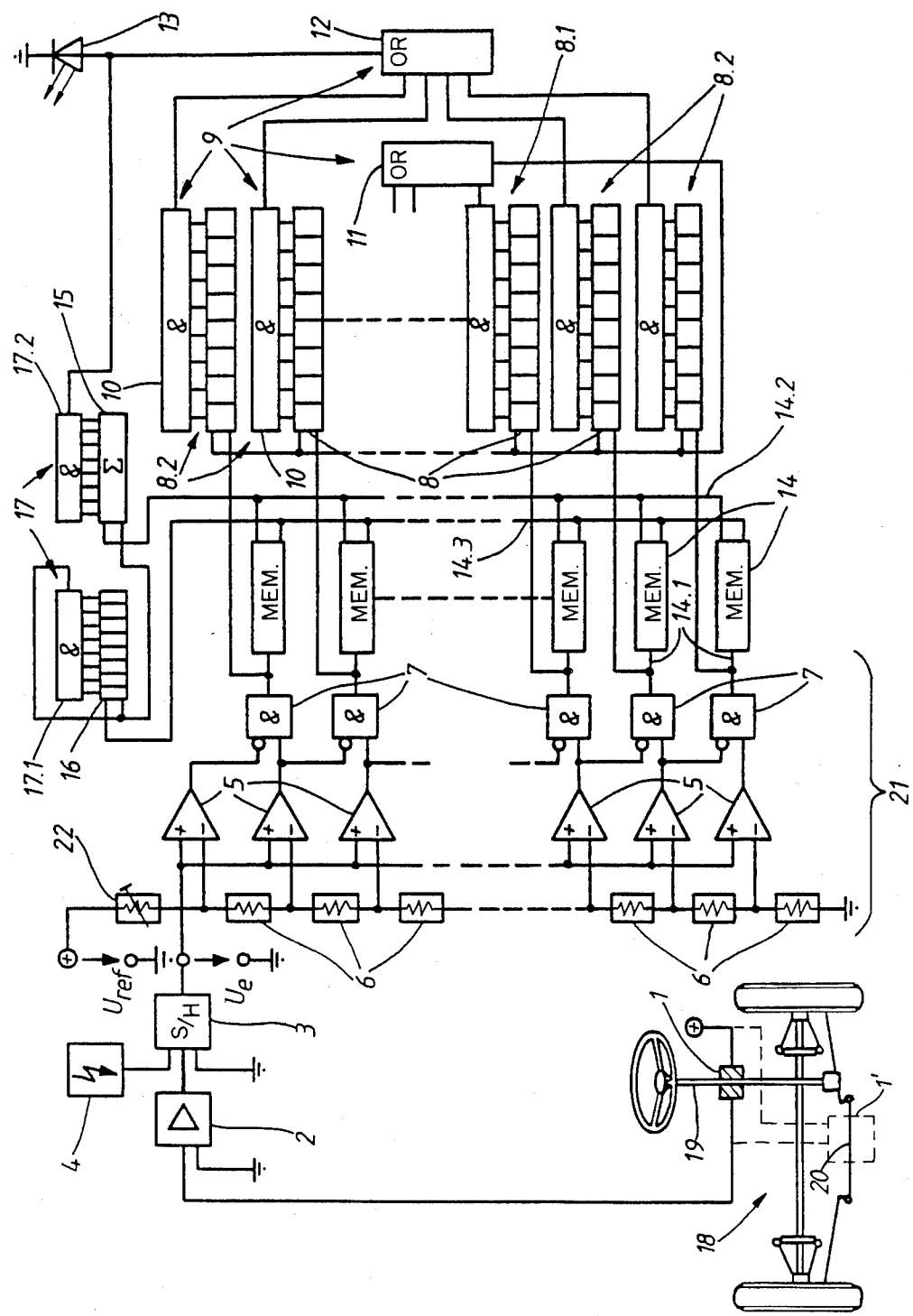

METHOD AND DEVICE FOR SIMULTANEOUSLY DETERMINING STEERING AND WHEEL SUSPENSION GEOMETRIES AND STATE OF BALANCE OF STEERING LINKAGE ROTATING PARTS

BACKGROUND AND SUMMARY OF THE INVENTION

The present invention relates to a method and device for simultaneous monitoring, while a motor vehicle is in motion, of the steering and wheel suspension geometries and the state of balance of rotating parts connected to the kinematic steering linkage of the motor vehicle.

A device for determining steering angle using frequencies is known ("Frequency Investigations of the Steering Deflections Occurring as a Function of the Operating Conditions" from Heider, H.: "Vehicle Steering", VEB Verlag Technik, Berlin, 1970). It serves to provide electro-mechanical classification, registration and indication of the steering angles employed and frequency of occurrence counters. The counts are analyzed by hand after the counters have been read.

The classification of the steering angles takes place by means of electrical switch contacts, a ring of thirty five contacts being fixed to the steering column tube and a moving contact being pivoted jointly with the steering column. Since no fixed contact is allocated to the straight ahead position of the steering column, or of the moving contact, the classification pitch is ten angular degrees in each case.

This scanning system is supplemented by further electrical contacts on the steering gear. These contacts offer the direction of rotation of the steering movements relative to the straight ahead position to the recording mechanism.

Analysis and interpolation of the class frequencies counted on different journeys using the known device provided different distribution curves whose clearly marked maxima were all located in or near the straight ahead position of the steering linkage.

The objective of the invention is to develop a method and device by which both maladjusted or damaged steering or wheel suspension geometries and unbalanced rotating parts connected to the steering linkage can be automatically recognized quickly during a journey and indicated to the vehicle driver.

This objective of the present invention is achieved by sensing the steering angle as a position of the steering linkage relative to the body work of the vehicle. To determine the state of the steering linkage, the steering angles are classified into classes graduated according to steering angle, magnitude and direction. The frequency of occurrence of the classes are counted. The position of the absolute maximum of the class of the steering angle frequency distribution relative to the straight ahead position of the steering linkage is continuously determined and analyzed during the journey as a criteria of the state of the steering wheel linkage. To determine the state of the balance of the rotating parts connected to the steering linkage, the movement of the steering wheel linkage is continuously determined from the sensed steering angle. These movements are continuously analyzed by comparison with specified values producing a criterion of the state of balance of the rotating parts. A warning signal is provided to the driver when the position of the distribution maximum deviating beyond a tolerance range from the straight forward position of the steering linkage is present and in the case when the unbalance of the rotating parts connected to the steering linkage are determined by the comparison.

For determining unbalance, the comparison is between the steering angle variance determined and the variance which is still permissible for the control condition with the parts balanced. Alternatively, the comparison can be between the frequency of the steering linkage vibrations with the rotational speed of, for example, one of the steered wheels. This agreement implies out-of-balance because out-of-balance-induced vibrations in the steering system are imposed by centrifugal force vectors rotating at wheel speed.

The device for carrying out the method includes a sensor for converting the position of the steering linkage relative to the body of the vehicle into a steering angle signal. A classation circuit is provided for dividing the steering angle signals into classes graduated according to the magnitude and direction of the steering angle. A counter allocated to each class records the frequency of occurrence of the class. A first analyzing circuit connected to the counter provides a reset signal to all of the counters when one of a first set of counters has the greatest content and provides a warning signal when one of the counters from the second group has the largest content. This warning signal indicates maladjusted or damaged steering or suspension geometries. A plurality of fixed value memories have a read enable control connected to the classification circuit and contents varying with the class to which they are allocated. The outputs of the fixed value memories are connected to a total memory which instantaneously adds its contents to the value supplied from the read enabled fixed value memory at each counting cycle. The counting memory has a contents which is increased by one at each counting cycle. A second analysis circuit is connected to the total memory and the counting memory for providing a reset signal to both memories when the contents of the counting memory reaches a specified maximum value and for providing a warning signal as an indication of unbalanced rotating parts when the contents of the totals memory containing a specific maximum value.

The classification circuit includes a plurality of comparators each connected to a distinct reference value and the sensor and a plurality of AND gates connected to the outputs of a pair of comparators to produce the classification. The output of the classification circuit causes a cycle of counting in the counting register and transmission of a fixed value from the fixed value memories to the totals memory. The output signal is produced by a voltage divider. A sample and hold circuit is included at the input of the classification circuit and the period is determined by a fixed distance of travel or proportional to the instantaneous speed. The sensor may be a rotational angle signal generator connected to the steering column or a displacement signal generator on the track rod of the steering linkage. The counting registers may be asynchronous electronic counters actuated by the output of a respective AND gate or pulsed time counters controlled by the pulse generator of the sample and hold and an output of a respective AND gate.

In the case of incorrectly adjusted or damaged steering or wheel suspension geometry, and also in the case of different air pressures in the steered tires, the vehicle tends to pull to one side and is involuntarily compensated by the driver steering in the opposite direction. Increased slip of the steered tires, accompanied by a reduction in their guidance capability and increased wear, are the results.

If the steering angle frequency distribution on an incorrectly adjusted steering linkage is determined, the distribution maximum will settle at a position different from the straight ahead position of the steering linkage.

Out-of-balance on rotating parts connected to the steering linkage (wheels, brake discs, drive shafts) leads to vibrations in the steering linkage and contributes substantially to its wear.

Relative to correctly balanced systems, out-of-balance of the rotating parts will lead to increased variance of the steering angles.

A device for indicating an incorrectly adjusted or damaged steering geometry is in fact known (U.S. Pat. No. 3,438,646). In this patent, however, the positions of the wheels relative to the track rod of a steering linkage are directly recorded by means of one inductive sensor each in two ball joints of the suspensions of the steered wheels. These positions are compared with one another by means of a bridge circuit of the inductive sensors. On pressing a button, the vehicle driver can obtain information on the condition of the steering geometry of his vehicle by means of two ammeter scales. Positions of the two scale fingers which deviate from one another indicate damage or incorrect adjustment. Assessment of the indications is left to the vehicle driver. The two sensors are complicated in design, heavily loaded mechanically due to the movement imposed on the wheels by road irregularities and have to be accurately adjusted although fitted at positions which are difficult to access. Indication of any out-of-balance condition which may be present is not possible with this device simply because of the indication inertia and damping of the indicating instruments.

A device for recording out-of-balance using rotating parts connected to a vehicle steering mechanism by means of a sensor attached to a part of the steering linkage is also known (German Pat. No. 2,819,687). This device uses the steering wheel and steering linkage vibrations due to an out-of-balance condition, recorded by a vibration sensor fastened to the steering wheel of a vehicle, as the criterion for the state of balance during balancing of the externally driven wheels on the jacked-up vehicle with the wheel suspensions unloaded. Apart from the fact that the device is only provided for stationary operation, there is no suggestion that this device can be used on the adjustment of the steering gear and the wheel suspensions.

Advantages of the present invention are:

By using a single sensor on the steering linkage and the automatic analysis of the sensor signals, both damage or faults at the steering gear and wheel suspensions and out-of-balance of rotating parts connected to the steering gear can be recognized quickly by the use of appropriate statistical methods, and signalled to the vehicle driver.

It is possible to generate a warning signal which varies according to the cause of the damage and which then permits an accurate fault signal which does not require any assessment.

Other objects, advantages and novel features of the present invention will become apparent from the following detailed description of the invention when considered in conjunction with the accompanying drawings.

BRIEF DESCRIPTION OF THE DRAWINGS

The figure is a schematic of a circuit according to the principles of the present invention.

DETAILED DESCRIPTION OF THE DRAWINGS

A rotational angle sensor 1 fastened to a steering column 19 of a motor vehicle steering linkage 18 converts rotations of the steering column relative to the vehicle bodywork into analogous electrical voltage signals. A displacement signal generator illustrated in phantom in the Figure as 1' on the track rod 20 of the steering linkage 18 could also be used in its place and this would then have to convert displacements of the track rod 20 relative to the bodywork into electrical signals.

A measurement amplifier 2 is, in appropriate cases, required for amplifying the voltage signals of the sensor 1. A sample and hold element 3, whose hold time is controlled by a pulse generator 4, is connected to the amplifier 2 output. The pulse generator 4 generates a pulse at a constant time interval or at a variable interval, for example after a fixed distance has been traveled or at a value proportional to speed.

A classification circuit 21, consisting of n signal comparators 5, n step resistances 6 and n-1 AND gates 7, divides the voltage signals $U_e$ into n-1 classes. An adjustable resistance 22 is provided for matching the classification circuit 21 to the characteristics of the particular sensor 1 used.

The read-enable inputs 14.1 of fixed value memories 14 are connected to the outputs of the AND gates 7. Counting registers 8, which are sub-divided into two groups 8.1 and 8.2, are also connected to the outputs of AND gate 7 in parallel with the fixed value memories 14.

An analysis circuit 9 for the counting registers 8 consists of AND gates 10 for each register, a first OR gate 11 for the first counting register group 8.1, and a second OR gate 12 for the second counting register group 8.2. The counting register 8 may be asynchronous electronic counters o pulse-timed electronic counters controlled by pulse generator 4.

An indicating device 13, which can be switched on by the second OR gate 12, is here shown for simplicity as a light emitting diode. The counting registers 8 are reset by first OR gate 11. Alternatively, the counters can be reset by an internal clock or after traveling a certain distance.

The outputs of the fixed value memory 14 are connected via a common data line 14.2 to a totals memory 15.

A pulse line 14.3, which conducts counting pulses from the fixed value memories 14 to a counting memory 16, runs in parallel to the data line 14.2. A further analysis circuit 17, for monitoring the conditions of the totals memory 15 and the counter memory 16, consists of AND gates 17.1 amd 17.2. AND gate 17.1 resets the memories 15 and 16 and AND gate 17.2 can switch on the indicating device 13.

The device functions as follows:

The sensor 1 is fed with plus potential from the on-board network. It should be assumed that it emits a very small output voltage in the case of a large movement of the steering column 19 to the left and almost all of the on-board voltage in the case of a strong movement to the right. In the straight ahead position of the steering column, it therefore emits an average voltage value.

The voltage signals analogous to the particular steering angles are amplified by the amplifier 2 and fed to the input of the sample and hold element 3. This is controlled by the pulse generator 4 in such a way that the voltage $U_e$ instantaneously present at the sampled inputs at each pulse is switched to the hold element output and there kept constant for the interval between two pulses.

The voltage signal $U_e$ is then present at the signal inputs of the signal comparators 5 connected in parallel. Their order is fixed by the series connection of the step resistances 6, to which a reference voltage $U_{ref}$ is applied. The step resistances 6 divide $U_{ref}$ into individual comparison voltages which are applied to each of the reference inputs of the signal comparators 5. The width of the steering angle or voltage classes is adjusted as required by appropriate dimensioning of the step resistances. The width of the steering angle can also be set to values which vary among themselves, for example narrower in the center around the straight ahead position of the steering mechanism and wider at the outside.

The signal comparators 5 provide binary output signals "Low" (L) when the signal voltage $U_e$ is smaller than the currently applied individual comparison voltage and "High" (H) when $U_e$ is larger than the particular individual comparison voltage.

In the exemplary embodiment, all the comparator outputs are correspondingly switched to L in the case of a large deflection of the steering column to the left and to H in the case of a large deflection to the right.

The outputs of each two comparators 5 in order sequence are applied to an AND gate 7, the output signal of the higher order comparator being inverted. The output signal of the AND gate only switches from L to H when the output signal of the comparator lower in the order is H and that of the comparator higher in the order is L. The reversed satisfaction of the AND condition, namely higher order signal H and lower order signal L, cannot appear in the circuit chosen.

A change from L to H at the outlet of one of the AND gates 7 causes an increase of the content of a corresponding counting register 8 by one; and via the read enable control input 14.1 (a) transmission of a fixed value from the corresponding fixed value memory 14 via the data line 14.2 to the totals memory 15 whereby the totals memory 15 adds the fixed value supplied to it to its instantaneous content and (b) transmission of a counting pulse from the fixed value memory 14 via the conductor 14.3 to the counting memory 16, which then increases its content by one.

The logical connection between two comparator outputs in each case ensures that at each pulse signal of the pulse generator 4, counting only takes place in the class in which the steering angle is instantaneously located. The branch of the device for monitoring steering gear and wheel suspensions is first explained and the out-of-balance recording branch is explained subsequently.

Asynchronous electronic counters (flip-flops) are, for example, used as the counting registers 8; their individual memory places can again only accept the conditions L or H. Thus, the steering angle frequencies are counted in the dual system.

The structure selected for the counting registers 8 permits very simple condition testing of all the counting registers. The distribution maximum is located in the class whose counting register is first counted full, i.e. all the memory places (or "bits") have assumed the condition H. By AND connection of all the bits of a counting register in an AND gate 10, it is possible to trigger a signal when this condition is reached because the output of the AND gate is then switched from L to H.

The first group 8.1 of counting registers 8 is allocated to the steering angle classes in the immediate vicinity of the straight ahead position. If the content of one of the counting registers of this group is the first to reach its maximum, it may be concluded that the distribution maximum is in the vicinity of the straight ahead position, and therefore, that the steering geometry and the wheel suspensions of the steered wheels are in order.

The second group 8.2 of counting registers 8 is concentric to the first group 8.1 and allocated to the steering angle classes located further from the straight ahead position. If one of the counting registers allocated to this group 8.2 is the first to be counted full, this is an indication that the steering is pulling to the side and that the vehicle driver is continuously steering against it.

The outputs of those AND gates 10 which are allocated to the first group 8.1 are connected to the first OR gate 11. This output signal is used as the reset signal for the counting registers 8 of both groups 8.1 and 8.2 and it is initiated when the output of one of the AND gates 10 from the first group 8.1 switches from L to H because the associated counting register 8 is counted full. The steering assembly is then in order and, if the journey is continued, the frequency counting begins afresh.

The outputs of the AND gates 10, which are allocated to the second counting register group 8.2, are connected to the second OR gate 12, whose output signal is used for switching on the indicating device 13. The logic circuitry is identical to that of the first group 8.1.

The bandwidth of the first group 8.1 about the straight ahead position is much smaller than that of the second group 8.2 but, in order to avoid worrying the vehicle driver, it should not be limited to a class corresponding to the straight ahead position. It may be that he has been driving his vehicle for a long time with a strong side wind and has to steer against it correspondingly without the steering assembly being damaged.

In addition to the indicating device 13 being switched on by the change of the output signal from the second OR gate 12 from L to H, a reset signal can also be supplied to all the counting registers 8. The device can correct "errors", for example, by the indicating device being switched off possibly with a delay after the reset signal. Only repeated illumination of the indication device then indicates steering system damage.

The out-of-balance recording, using the device shown, uses the increase in the steering angle variance relative to a control value when out-of-balance appears on wheels, brake discs or drums.

The variance of a measured quantity x is calculated from the formula $$V(x) = \frac{1}{N} \sum_{i=1}^{N} (x_i - \bar{x})^2$$

where:
$V(x)$ = variance,
$N$ = number of countings or samples,
$x_i$ = measured quantity values on counting/sample,
$\bar{x}$ = average of measured values, $(x_i - \bar{x})^2$ = squared distance of the measured quantity from the average value.

As already mentioned, a fixed value is transmitted from a fixed value memory 14 to the totals memory 15 and a counting pulse is transmitted from the same fixed value memory 14 to the counting memory 16 with every counting cycle in a counting register 8. Each of the fixed value memories 14 contains the value of the squared distance between its steering angle class and the class of the average value or $(x_i - \bar{x})^2$. According to the invention, the class of the average value $\bar{x}$ is allocated to the straight ahead position (the steering angle which is usually employed most often). For each cycle of counting of the totals memory 15, the totals memory 15 contains the current value of the steering angle variance multiplied by the number of samples or counting and the counting memory 16 containing the number of samples or cycles of countings.

Both memories 15, 16 are again electronic counters with a particular number of bits. Both capacities or maximum contents are selected such that, when they are simultaneously fully counted, a maximum expected permissible variance value for the balanced control condition is given by the equation $$\frac{\text{Content of totals memory 15}}{\text{Content of counting memory 16}} = \text{variance value.}$$

Using the analysis circuit 17, it is very easy to check whether the limiting value of the variance is being observed or exceeded. The output signal of the AND gate 17.1, switches over from L to H when the counting memory 16 is counted full, and acts as the reset signal for both memories 15 and 16.

The switching of the output signal from the AND gate 17.2 from L to H when the totals store 15 is counted full acts to switch on the indicating device 13 because, in this case, there is an increased steering angle variance. If the counting memory 16 is counted full before totals memory 15, totals memory 15 is reset because, in this case, the limiting value of the variance is not reached for the specified number of samples.

Each of the analysis circuits 9 and 17 could produce its own signal instead of switching the common indicating device 13, as shown. This arrangement can then warn the vehicle driver visually, acoustically or in some other suitable manner in a way differentiated according to the cause of the fault. Similarly, the two branches of the device could be used independently of one another. It is not functionally necessary to provide the same number of counting registers 8 and fixed value memories 14. In the structure shown, the steering angle distribution is determined from the frequencies with which the class boundaries are exceeded and thus a minimum of two counters, one for 8.2 and one for 8.1 respectively.

Using pulse-timed counting registers 8, fixed value memories 14, totals memories 15 and counting memories 16, the device can be designed for determining the steering angle distribution according to sampling frequency.

With respect to the determination of the steering angle variance, however, the structure shown is to be preferred.

The device essentially includes the sensor (1), an analog/digital converter with classification circuit (3–7), and a recording and analysis unit to be produced, for example, as an integrated circuit (IC) with indicating device (8–17) controlled from it.

It can be installed, with little effort, in any motor vehicle which has a kinematic steering linkage. If there is an on-board computer present, there would be no difficulty in integrating the integrated circuit mentioned into the on-board computer.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Method for simultaneous monitoring, while a motor vehicle is in motion, the state of its steering and wheel suspension geometries and the state of balance of rotating parts connected to the kinematic steering linkage of the motor vehicle comprising:

sensing the steering angles as the positions of the steering linkage relative to the bodywork of the motor vehicle;

classifying the steering angles into classes graduated according to steering angle magnitude and direction;

counting frequencies of occurrence of each class;

continuously determining and analyzing the position of the absolute maximum of the class of steering angle frequency distribution determined relative to the straight ahead position of the steering linkage during the journey as a criterion of the state of the steering linkage;

continuously determining movements of the steering linkage from said sensed steering angle;

continuously analyzing the movement of the steering linkage by comparison with specified values as a criterion of the state of balance of the rotating parts connected to the steering linkage; and providing a warning signal to the vehicle driver both in the case of a position of the distribution maximum deviating beyond a tolerance range from the straight ahead position of the steering linkage and in the case of unbalance of the rotating parts connected to the steering linkage being determined by the comparison.

2. Method according to claim 1, wherein analyzing said movement of the steering linkage includes summing said determined movements of steering linkage to provide a value corresponding to the variance of the sensed steering angles which is compared with a specified steering angle variance value which is still permissible in the case of the control condition where the parts are unbalanced, and said warning signal is provided when the variance determined exceeds the permissible value.

3. Method according to claim 1, wherein the determined movements of the steering linkage which are the frequency of load alternations within the steering linkage are compared with the rotational speed of a rotating part connected to the steering linkage, and said warning signal is provided if the two frequencies agree, at least approximately, within a specified interval.

4. A device for simultaneous monitoring, while a motor vehicle is in motion, the state of its steering and wheel suspension geometries and the state of balance of rotating parts connected to the kinematic steering linkage of the motor vehicle comprising:

a sensor means for converting the positions of the steering linkage relative to the bodywork of the vehicle into steering angle signals;

a classification means for dividing the steering angles signals into classes graduated according to the magnitude and direction of the steering angle;

counting means allocated to each class for storing the frequency of occurrence of a class, said counting means being divided into a first and second group;

a first analysis means connected to the counting means, for providing a reset signal to all the counting means when one of the counting means from the first group has the greatest content and providing a warning signal when a counting means from the second group has the largest content;

fixed value memory means having a read-enable control input connected to said classification means and having contents varying with the class to which they are allocated;

a totals memory means having its inputs connected to the outputs of the fixed value memories means for adding its instantaneous contents to the value supplied to it from the read-enabled fixed value memory means at each counting cycle of a counting means;

a counting memory means whose content is increased by one at each counting cycle in one of the counting means;

a second analysis means connected to the totals memory means and the counting memory means for providing a reset signal to both memory means when the content of the counting memory means reaches a specified maximum value and providing a warning signal when the content of the totals memory attains a specified maximum value; and indicating means connected to said first and second analyzing means for indicating said warning signals.

5. Device according to claim 4, wherein the counting means have limited capacity and that overflowing of one of the counting means determines the time at which the first analysis means provides the reset signal to the counting means and the warning signal to the indicating means.

6. Device according to claim 4, wherein the first analysis means provides the reset signal to the counting means when providing the warning signal at a time determined by an internal clock.

7. Device acoording to claim 4, wherein the first analysis means provides the reset siqnal and the warning signal after a certain distance traveled, recorded by a distance traveled signal generator.

8. Device according to claim 4, wherein said classification means includes a sample and hold means having an input from the signals analogous to the sensor, a plurality of comparator means for comparing the output of the sample and hold means with corresponding plurality of reference values, said comparator means being arranged in order such that the binary output signals of each two of n signal comparators in sequential order are logically connected together in one of n-1 AND gates and that an output signal of an AND gate causes a counting cycle in the counting means and causes a transmission of a fixed value from the fixed value memory means to the totals memory means.

9. Device according to claim 8, wherein the sensor means generates a voltage signal ($U_e$) analogous to the steering angle and the reference values at the comparator means are formed by divider means dividing a voltage ($U_{ref}$) at resistances connected in series.

10. Device according to claim 8, wherein said sample and hold means is pulsed by a pulse generator means at constant time intervals.

11. Device according to claim 10, wherein said counting means are pulsed-timed electronic counters controlled by the pulse generator means to increase their content by one when a pulse generator means signal occurs and the counter input is simultaneously switched to "High" by a corresponding AND gate.

12. Device according to claim 8, wherein said hold means is pulsed by a pulse generator means, which generates pulses at an interval varied in proportion to the instantaneous traveling speed.

13. Device according to claim 8, wherein the sample and hold means is pulsed by a pulse generator which generates a pulse each time a fixed distance has been traveled.

14. Device according to claim 8, wherein said counting means includes asynchronous electronic counters which increase their content by one only when the output signal of the respective AND gate changes from "Low" to "High".

15. Device according to claim 4, wherein said sensor means includes a rotational angle signal generator on the steering column of the steering linkage.

16. Device according to claim 4, wherein said sensor means includes a displacement signal generator on the track rod of the steering linkage.

* * * * *